UNITED STATES PATENT OFFICE.

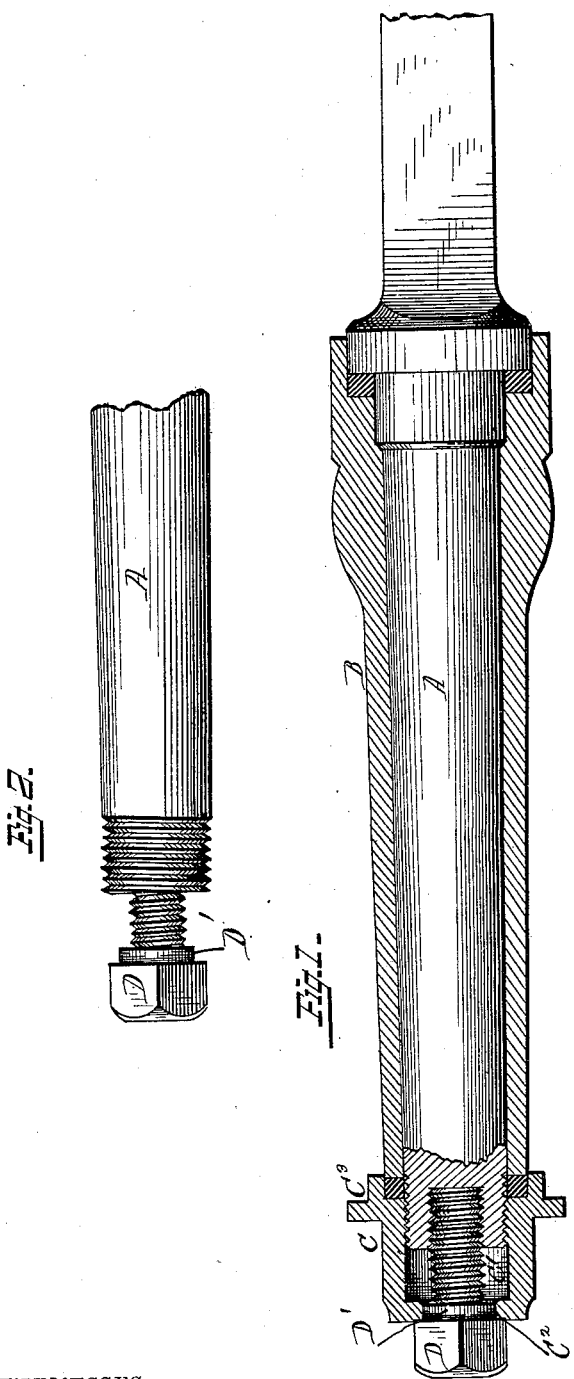

HENRY F. PHILLIPS, OF AUBURN, NEW YORK, ASSIGNOR TO SHELDON & CO., OF SAME PLACE.

HUB-ATTACHING DEVICE.

SPECIFICATION forming part of Letters Patent No. 282,767, dated August 7, 1883.

Application filed February 12, 1883. (No model.)

*To all whom it may concern:*

Be it known that I, HENRY F. PHILLIPS, of Auburn, county of Cayuga, State of New York, have invented certain new and useful Improvements in Hub-Attaching Devices, of which the following is a full and exact description, reference being had to the accompanying drawings, making part of this specification, in which—

Figure 1 is a longitudinal section through the hub-box and nut, showing the set-screw and a portion of the spindle in full lines; and Fig. 2 is a view of a portion of the spindle, showing the set-screw inserted therein.

My invention consists in the combination, with the spindle provided with an externally and internally screw-threaded end, of a nut adapted to fit upon the external thread, and a set-screw or bolt adapted to pass through a perforation formed in the nut and to enter the internal thread for locking the nut on the axle-arm, and for compensating for the wear of the parts, as hereinafter explained.

In the accompanying drawings, A represents the spindle, and B the box, these parts being constructed in any usual or preferred manner. The outer end of the spindle is provided with an external screw-thread of the same diameter as the end of the hub-bore, which is adapted to receive a nut, C, hereinafter referred to. This screw-thread is cut of sufficient length to provide for the taking up of any end-play caused by the wearing of the parts, in a manner hereinafter explained.

C is a nut provided with the usual internal screw-thread, adapting it to fit the external screw-threaded end of the spindle. This nut is extended in length or height, and is bored out, as shown at C', so as to leave a space or chamber between the end of the spindle and the inner face of the head of the nut when the nut is in place, said chamber being of the same diameter as the end of the spindle. The nut is further provided with a perforation, $C^2$, in its end, through which the set-screw or bolt, hereinafter referred to, is passed to engage the internal thread in the end of the spindle. The inner edge or face of the nut, or that part adjacent to the end of the box, is provided with a cylindrical rim or flange, $C^3$, adapted to fit over the end of the box. The inner circle of this flange is of about the same diameter as the external diameter of the box, and provides a space for the insertion of a flexible packing or washer between the inner face of the nut and the end of the box, for said box to turn against.

D is the set-screw or bolt, having a squared head or end, and provided with a collar or cylindrical enlargement at the base of the screw-thread, as shown at D', and which enlargement is of the same diameter as the perforation in the nut, and when the nut is in place fitting snugly therein. The external thread on the spindle is cut in the reverse direction to the line of travel of the wheel, and the internal thread of the spindle is cut or tapped out in a reverse direction to the outer thread—that is to say, one being a left and the other a right hand thread, or vice versa. By this arrangement it will be seen that, the nut being screwed upon the spindle and the bolt or nut with a reverse thread passing through the same into the end of the spindle, and being tightened up so that the head of the bolt shall jam or be brought into close contact with the head of the nut, a complete lock will be formed. By providing the end of the nut with the enlargement or chamber it will be seen that any end-play of the box can be taken up, as said chamber provides sufficient space, into which the end of the spindle may be drawn. By cutting the external thread of the nib in a reverse direction to the line of travel of the wheel, the tendency would be to tighten or draw the nut up against the end of the box to such an extent as to jam or prevent the hub from turning; but by means of the screw or bolt passing through the nut into a reverse internal thread said nut is locked in both directions, and all tendency of the nut to turn either off or on after being properly set is effectually obviated.

Having now described my invention, I claim—

1. The spindle provided with reverse external and internal threads, in combination with the nut and with the screw or bolt adapted to pass through said nut and engage the internal thread in the spindle, substantially as and for the purpose set forth.

2. The spindle provided with reverse external and internal threads, the nut having the chamber or annular recess formed therein, in combination with the screw or bolt adapted to pass through said nut and engage the internal thread in the spindle, substantially as and for the purpose set forth.

HENRY F. PHILLIPS.

Witnesses:
CHAS. H. GILLAM,
FRED S. CRONCH.